United States Patent [19]
Bueler et al.

[11] 3,768,869
[45] Oct. 30, 1973

[54] CONTROL VALVE AND SYSTEM

[75] Inventors: Richard C. Bueler, Des Peres;
Edward J. Falk, St. Louis, both of Mo.

[73] Assignee: Wagner Electric Corporation, Newark, N.J.

[22] Filed: May 8, 1972

[21] Appl. No.: 250,948

[52] U.S. Cl. ................................................ 303/6 C
[51] Int. Cl. ................................................ B60t 13/00
[58] Field of Search ............................... 303/6 C; 137/111–114

[56] References Cited
UNITED STATES PATENTS
3,393,511 7/1968 Reichard...................... 303/6 C X
3,659,420 5/1972 Reinecke ...................... 303/6 C X

*Primary Examiner*—Richard A. Schacher
*Attorney*—Joseph E. Papin

[57] ABSTRACT

A control valve is provided with a pair of modulating valves in parallel flow relation, and each of such modulating valves are generally operable to interrupt the parallel flow relation upon the modulating operation of the other thereof to effect a reduced application through said control valve of fluid pressure supplied thereto.

17 Claims, 4 Drawing Figures

Patented Oct. 30, 1973

CONTROL VALVE AND SYSTEM

FIELD OF THE INVENTION

This invention pertains generally to brake systems and in particular to control valves for use therein.

BACKGROUND OF THE INVENTION

In the past vehicle brake systems, the braking capacity between the front and rear axle brakes of a truck or tractor for use with a trailer was usually balanced or divided so that the front axle brakes accomplished 25 to 35 percent of the braking effort and the rear axle brakes accomplished the other 65 to 75 percent of such braking effort. Due to the Newtonian mechanics of decelerating or stopping a vehicle which involves the vehicle length of wheel base, static load distribution, and the height of the vehicle center of gravity from the roadbed, etc., the potential torque increase or increased braking effort of the front axle brakes due to high deceleration vehicle stops can be of such magnitude as to result in front to rear axle brake balance, or redistribution of such brake balance, in the range of 50 percent for the front axle brakes and 50 percent for the rear axle brakes or perhaps even greater. In order to take advantage of the front to rear axle brake torque redistribution, front axle brakes having the capacity to accommodate such redistribution must be provided on the vehicle, such as front axle brakes having significantly greater torque or braking effort generating potential. When the front axle brakes having the aforementioned significantly greater torque or braking effort generating potential was provided on the vehicle, the aforementioned redistribution of front to rear axle braking efforts effected during rather high vehicle decelerations resulted in the following undesirable or disadvantageous features: (1) an increasing tendency for early front wheel skidding; (2) a deleterious affect on vehicle steerability; (3) a deleterious imposition of increased loads or forces on the vehicle front suspension components during braking; and (4) a deleterious imposition of significantly increased loads on the vehicle front tires during braking which results in premature front tire wear. From the foregoing, it is apparent that high levels of front axle brake torque are required to produce high vehicle deceleration rates, but high levels of front axle brake torque can only be utilized if high vehicle decelerations were actually produced; however, this apparent paradox was due to the fact that high vehicle deceleration rates were required to effect sufficient weight transfer to the front axle to effect the utilization of the large magnitudes of front axle torque.

The principle object of the present invention is to provide a brake system and a control valve for use therein which overcomes the aforementioned disadvantageous or undesirable features, and this, as well as other objects and advantageous features of the present invention, will become apparent from the specification which follows.

SUMMARY OF THE INVENTION

Briefly, the present invention includes a control valve having a pair of modulating means therein in parallel flow relation, said modulating means each being generally operable to interrupt said parallel flow relation upon the modulating operation of the other thereof to effect a reduced application through said control valve of fluid pressure supplied thereto under preselected conditions, respectively. The invention also contemplates a fluid pressure system having the aforementioned control valve interposed therein between a fluid pressure supply for said system and a friction device.

RELATED PATENTS

This patent application is related to U.S. Pats. Nos. 3,278,241 and 3,423,936 issued on Oct. 11, 1966 and Jan. 28, 1969 to W. Stelzer, respectively, but this patent application is a patentably distinct improvement.

BRIEF DESCRIPTION OF THE DRAWINGS

In the drawings which illustrate embodiments of the present invention and wherein like numerals refer to like parts wherever they occur.

DETAILED DESCRIPTION OF THE INVENTION

Figure 1:
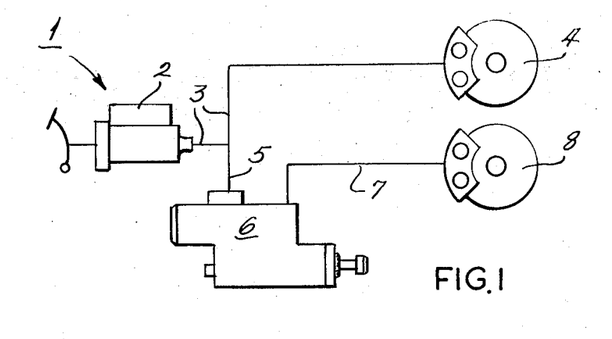
FIG. 1 is a schematic view of a fluid pressure system embodied in the present invention.

Referring now to the drawings in detail and in particular to FIG. 1, a vehicle fluid pressure or brake system 1 is provided with fluid pressure generating means, such as the master cylinder 2, which is connected by a conduit 3 to a friction device or rear brake 4 of the vehicle rear axle brake set (not shown), and another conduit 5 is connected between the conduit 3 and the inlet port of a control valve 6 while the outlet port of said control valve is connected by a conduit 7 to another friction device or front brake 8 of the vehicle front axle brake set (not shown). To complete the description of the system 1, it is assumed that the torque or braking capabilities of the rear brakes 4 are greater than or at least equal to that of the front brakes 8.

Figure 2:
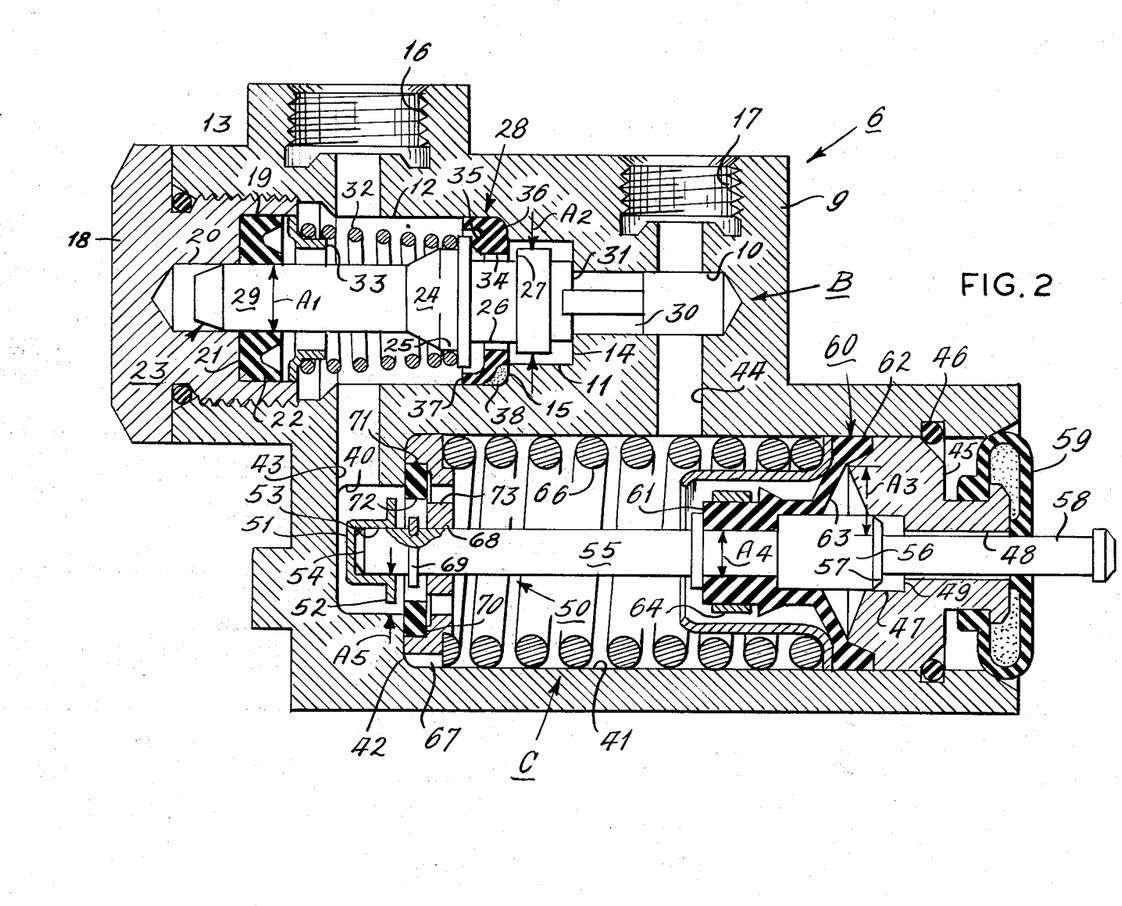
FIG. 2 is a sectional view illustrating the control valve of FIG. 1 also embodied in the present invention in cross-section.

The control valve 6 is provided with a housing 9 having an upper bore 10 axially aligned with stepped counterbores 11, 12, 13, and annular shoulders 14, 15 are provided on said housing between said bore and counterbore 10, 11 and said counterbores 11, 12, respectively. Inlet and outlet ports 16, 17 which receive conduits 5, 7 as previously mentioned, are provided in the housing 9 intersecting with the counterbore 12 and the bore 10, respectively, and a closure member 18 is threadedly received in the leftward or open end of the counterbore 13. The closure member 18 is provided with a pair of stepped bores 19, 20 having an annular shoulder 21 therebetween, and an annular sealing member or cup 22 is seated against said shoulder in sealing engagement with the larger stepped bore 19.

A modulating, metering or proportioning means, such as the piston member indicated generally at 23 is provided with an annular head or metering portion 24 having an annular radial flange or retainer portion 25 thereon, and peripheral groove means 26 is provided in said head portion defining an annular metering or proportional shoulder or valve member 27 for metering engagement with a cooperating seating member, such as the annular seating or cup member indicated generally at 28 and discussed hereinafter. The proportioning piston 23 is also integrally provided with opposed reduced portions or extension means 29, 30, and the leftward extension 29 extends coaxially through the closure member cup 22 in sealing engagement therewith into sliding and guiding engagement with the closure member smaller stepped bore 20. The rightward extension 30 of the proportioning piston 23 is slidably and guidably received in the housing bore 10, and an annular shoulder 31 is provided on said rightward extension for abutting engagement with the housing shoulder 14 to define the inoperative, static or at-rest position of said proportioning piston. A metering or proportioning spring 32 is pre-compressed in abutting engagement between the proportioning piston retainer 25 and another annular retainer 33 which is press fitted in the interior end of the closure member larger stepped bore 19, said proportioning spring normally urging said proportioning piston toward its inoperative position engaging the extension shoulder 31 thereof with the housing shoulder 14.

The seating member 28 is provided with a centrally located aperture 34 extending axially therethrough between opposed side portions 35, 36 of said seating member and radially spaced from the groove 26 of the proportioning piston 23. The seating member side 36 is normally seated in abutting engagement with the housing shoulder 15 and also defines a valve seat about the seating member aperture 34 for metering engagement with the metering valve member 27 of the proportioning piston 23. The seating member 28 is also provided with a peripheral lip 37 in sealing engagement with the housing counterbore 12, and a plurality of axially extending return flow passages 38 are provided between the seating member side 36 and lip 37, said return flow passages being normally closed by the sealing engagement of said lip with said housing counterbore.

The sealing engagement of the proportioning piston extension 21 with the closure member seal 22 defines an effective closing area $A_1$ on the proportioning piston 23 for subjection to the fluid pressure at the inlet and outlet ports 16, 17, and the sealing engagement of the proportioning piston valve member 27 with the seating member valve seat 36 defines an effective area $A_2$ on said proportioning piston for subjection to the fluid pressure at said outlet port, as discussed hereinafter.

The housing 9 is also provided with a lower bore 40 which is axially aligned with a counterbore 41 having an annular shoulder or valve seat 42 therebetween, and connecting passages 43, 44 are interposed between the housing bore 40 and counterbore 12 and the housing bore 10 and counterbore 41 in parallel flow relation across the proportioning piston 23, respectively. A closure member 35 is retained in the rightward end of the housing lower counterbore 41 against displacement by a snap ring and groove assembly 46, and a pair of stepped bores 47, 48 are provided through said closure member having an annular shoulder 49 therebetween.

Another modulating, metering or proportioning means, such as the valve device indicated generally at 50, is provided with a cup or top-hat shaped element or piston 51 having a radially extending flange or valve member 52 and a blind bore 53 which is slidably received on the interior end portion 54 of a stem or rod member 55. The stem 55 is provided with an enlarged or flanged intermediate portion 56 which is slidably received in the closure member larger stepped bore 47, and an annular shoulder 57 is provided on said stem between said intermediate portion and an exterior end portion 58 thereof for abutment with the closure member shoulder 49, said exterior end portion extending coaxially through the closure member smaller stepped bore 48. A resilient boot 59 is provided connecting between the closure member 45, the stem exterior end portion 58 and the housing counterbore 41 to prevent the entry of foreign particles into the control valve 6.

A resilient annular sealing or diaphragm member, indicated generally at 60, is provided with integral annular inner and outer bead portions 61, 62 interconnected by a flexible diaphragm portion 63, and said inner bead portion is sealably engaged with the stem intermediate portion 56 being retained thereon against displacement by an annular split retainer or compression ring 64. The sealing member outer bead 62 is maintained in sealing engagement between the interior end of the closure member 45 and the housing counterbore 41 by a cup-shaped retainer member 65 through which the stem 55 extends coaxially, and said retainer member is biased into engagement with the outer bead 62 by the compressive force of a metering or proportioning spring 66 engaged therewith.

A valve plate or metering piston member 67 is slidably received in the housing counterbore 41 being urged toward engagement with the housing shoulder 42 by the metering spring 66, and a centrally located bore 68 is provided in said piston member being slidably received on the stem 55, said stem having a snap ring and groove assembly 69 thereon defining an abutment predeterminately spaced from said valve plate for driving or abutting engagement therewith about said bore. A recess 70 is provided in the piston member 67, and an annular seal or metering valve member 71 having a central aperture or passage means 72 therethrough is provided in said recess being normally urged into sealing engagement with its cooperative housing shoulder or valve seat 42. A plurality of other aperture or passage means 73 are axially provided through the piston member 67 normally in open pressure fluid communication with the valve aperture 70 and the inlet and outlet ports 16, 17 when the valve member 52 of the top-hat element 51 is displaced from sealing engagement with the valve member 71 which defines a cooperating seat about its passage 72 for said valve member 52.

The diaphragm member 60 is provided with an annular effective area $A_3$ defined between the bending or flexing radius thereof and the sealing engagement of its inner bead 67 with the stem 55, and said stem is also provided with an effective area $A_4$ defined by the sealing engagement thereof with said diaphragm member inner head, said areas $A_3$, $A_4$ being subjected to the fluid pressure at the outlet port 17. Another annular effective area $A_5$ is defined on the piston member 67 by the sealing engagement of the metering valve member 71 with the housing valve seat 42, and said area $A_5$ is subjected to the fluid pressure at the inlet and outlet ports 16, 17, respectively, as discussed hereinafter.

To complete the description of the control valve 6, it should be noted that the housing upper bore 10 and counterbores 11, 12 define a flow passage, indicated generally at B, between the inlet and outlet ports 16, 17 which is controlled by the proportioning valve 23, and the housing lower bore and counterbore 40, 41 and connecting passages 43, 44 define another flow passage, indicated generally at C, which is connected in parallel or shunt flow relation with the flow passage B between said inlet and outlet ports, said flow passage C being controlled by the metering device 50.

OPERATION

In the operation with the component parts of the system 1 and control valve 6 positioned as shown in the drawings and as described hereinbefore, a supplied or input fluid pressure P is transmitted upon operator actuation of the master cylinder 2 through the conduit 3 to effect energization of the vehicle rear brake 4 and also through the conduit 5 to the inlet port 16 of said control valve. The supplied fluid pressure P flows from the inlet port 16 through the housing upper counterbore 12, the seating member aperture 34, the counterbore 11 and the bore 10 to establish an output or applied fluid pressure Po at the outlet port 17, and the applied fluid pressure Po thereafter flows through the conduit 7 to effect energization of the vehicle front brake 8 substantially simultaneously with the aforementioned energization of the vehicle rear brake 4. It should be noted that the parallel flow passage C also may provide for the flow of the supplied fluid pressure P from the housing upper counterbore 12 through the connecting passage 43, the housing lower bore 40, the metering piston apertures 72, 73, the counterbore 41 and the connecting passage 44 to the upper bore 10 and outlet port 17, and, of course, the supplied fluid pressure P will choose the one of the parallel flow paths B, C which offers the least resistance to its flow through the control valve 6.

Figure 3:
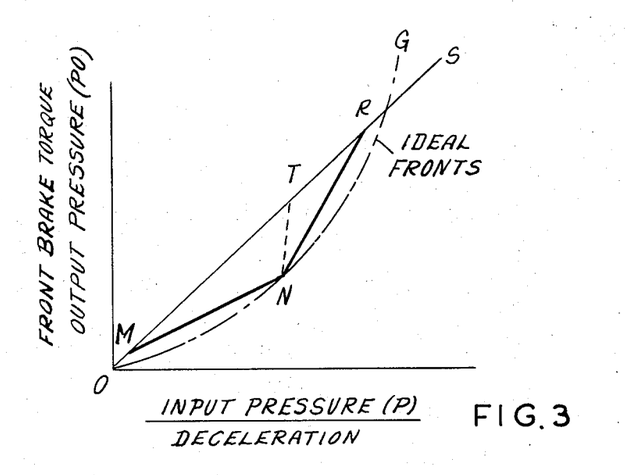
FIG. 3 is a graphical representation illustrating the applied or output fluid pressure effected by the control valve of FIG. 2 in response to the supplied or input fluid pressure as compared with a theoretical or ideal curve.

The supplied fluid pressure P acts on the effective closing area $A_1$ of the proportioning piston 23 to establish a closing force $P A_1$ tending to urge said proportioning piston against the compressive force Fc of the proportioning spring 32, and the supplied fluid pressure P also acts on the effective closing area $A_3 + A_4$ of the metering device 50 to establish another closing force $P (A_3 + A_4)$; however, the proportioning spring force Fc and the inherent resiliency of the diaphragm member 60 oppose movement of said proportioning piston and the stem 55 of said metering device until the applied fluid pressure P attains a predetermined value M as shown on the line OS in the graph of FIG. 3.

When the predetermined value M of the supplied fluid pressure P is attained, the closing forces $P A_1$, $P (A_3 + A_4)$ overcomes the proportioning spring force Fc and the inherent resiliency of the diaphragm member 60, and in this manner, the proportioning piston 23 is moved leftwardly toward an isolating position engaging the valve member 27 with the seating member valve seat 36 and the stem 55 is moved rightwardly to drivingly engage the abutment 69 thereof with the metering piston 67 and move the valve member 51 into sealing engagement with the metering piston valve seat 71; therefor, the engagement of the proportioning piston valve member 27 with the seating member valve seat 36 and the sealing engagement of the valve member 51 with the metering piston valve seat 71 interrupts pressure fluid communication through the parallel flow paths B and C between the inlet and outlet ports 16, 17, respectively. Upon the engagement of the proportioning piston valve member 27 with the seating member valve seat 36, the supplied fluid pressure P acts on the effective input area $A_2 - A_1$ of the proportioning piston 23 to establish an input force $P (A_2 - A_1)$ which is additive to the proportioning spring force Fc to substantially balance the opposed output force $Po A_2$ established by the applied fluid pressure Po at the outlet port 17 acting on the effective output area $A_2$ of said proportioning piston.

From the graphical representation in FIG. 3, it is obvious that an increase in the magnitude of the supplied fluid pressure P in excess of the predetermined value M, as shown by the line OS, will result in proportionally reduced increases in the applied fluid pressure Po, as shown by the line MN. For instance, when the supplied fluid pressure P is increased to a value in excess of the predetermined value M but less than the predetermined value T, the input force $P (A_2 - A_1)$ is correspondingly increased and additive to the proportioning spring force Fc to overcome the output force $Po A_2$; therefor, the proportioning piston 23 is moved in a rightwardly direction toward a metering position disengaging the valve member 27 thereof from the seating member valve seat 36 to effect a metered application of the supplied fluid pressure P from the counterbore 12 through the seating member aperture 34, the counterbore 11 and the bore 10 to the outlet port 17 to effect a proportional increase of the applied fluid pressure Po at the outlet port 17 in a predetermined ratio with the supplied fluid pressure P at the inlet port 16, as shown by the line MN in the graph of FIG. 3 wherein: $Po = [P (A_2 - A_1) + Fc]/A_2$. Of course, the increased applied fluid pressure Po effects a corresponding increase in the output force $Po A_2$, and when the increased output force $Po A_2$ attains an increased value substantially equal to that of the increased input force $P (A_2 + A_1)$ and the additive proportioning spring force Fc, the proportioning piston 23 is again moved toward its isolating position to re-engage the valve member 27 with the seating member valve seat 36 to again isolate the increased supplied and applied fluid pressures P, Po. It is, of course, obvious that the proportioning piston 23 will be responsive to further increases in the supplied fluid pressure P to effect further corresponding proportional increases in the applied fluid pressure Po in the same manner as previously described above, until the supplied and applied fluid pressures P, Po respectively attain the predetermined values T and N.

With the metering device 50 in its isolating position having the valve member 51 engaged with the metering piston seal 71, as previously mentioned, the increased supplied and applied fluid pressures P, Po at the inlet and outlet ports 16, 17 act on the effective additive area $A_4 + A_5$ and $A_3 - A_5$ of the metering device 50 to establish an input force $P (A_4+A_5) + Po (A_3 - A_5)$ and an opposing output force $Po A_5$, respectively. From the graphical representation in FIG. 3, it is obvious that further increases in the magnitude of the supplied fluid pressure in excess of the predetermined value T, as shown on the line OS, will result in a proportionally increasing increase in the output fluid pressure Po, as shown by the line NR. For instance, when the supplied fluid pressure P is increased to a value in excess of the predetermined value T but less than the predetermined value R, the input force $P (A_4 + A_5) + Po (A_3 - A_5)$ is correspondingly increased to overcome the output force $Po A_5$ and the additive compressive force Fs of the metering spring 66; therefore, the valve member 51, metering piston 67 and stem 55 are concertedly movable in a rightward direction toward a metering position disengaging the metering piston valve member 71 from its cooperating housing valve seat 42 to effect a further metered application of the supplied fluid pressure $P$ from the housing lower bore 40 through the lower counterbore 41 and connecting passage 44 to the outlet port 17 to effect a further proportional increase of the applied fluid pressure $Po$ in a predetermined ratio with the supplied fluid pressure $P$ at the inlet port 16, as shown by the line NR in the graph of FIG. 3 wherein: $Po = [P(A_4 + A_5) - Fs]/2A_5 - A_3$. Of course, the increased applied fluid pressure $Po$ effects a corresponding increase in the output force $Po\,A_5$, and when the increased output force $Po\,A_5$ and the additive metering spring force $Fs$ attains an increased value substantially equal to that of the increased input force $P(A_4 + A_5) + Po(A_3 - A_5)$, the metering device 50 is again moved leftwardly toward its isolating position to re-engage the metering piston valve member 71 with the housing valve seat 42 to again isolate the increased supplied and applied fluid pressures $P, Po$. It is, of course, obvious that the metering device 50 will be responsive to further increases in the supplied fluid pressure $P$ to effect further corresponding proportional increases in the applied fluid pressure $Po$, in the same manner as previously described, until the supplied and applied fluid pressures $P, Po$ respectively attain magnitudes of the predetermined value R, as shown on the line OS. When the supplied and applied fluid pressures $P, Po$ attain the predetermined value R, the input force $P(A_4 + A_5) + Po(A_3 - A_5)$ attains a magnitude which overcomes the additive metering spring and output forces $Fs$ and $Po\,A_5$ wherein the valve member 51, the stem 55 and the metering piston 67 are concertedly movable in a rightward direction toward an open position effecting an equalizing or open pressure fluid communication between the inlet and outlet ports 16, 17 through the upper housing counterbore 12, the connecting passage 43, the housing lower bore and counterbore 41 and the connecting passage 44. In this manner, when the metering device 50 is in its open position, the supplied and applied fluid pressures $P, Po$ are again blended at magnitudes thereof in excess of the predetermined value R, as shown by the line RS in the graph of FIG. 3.

When the master cylinder 2 is deactuated, the supplied fluid pressure $P$ is vented to the atmosphere which effects de-energization of the rear brake 4 and eliminates the input force $P(A_2 - A_1)$ acting on the proportioning piston 23 as well as eliminating the force $P(A_4 + A_5)$ acting on the metering device 55. Upon the reduction of the supplied fluid pressure $P$ to a value less than the predetermined value R on the line OS in the graph of FIG. 3 in response to the deactuation of the master cylinder 2, the force $Fs$ of the metering spring 66 concertedly urges the valve member 51, the step 55 and metering piston 67 leftwardly to re-engage the metering valve member 71 with the housing valve seat 42 which momentarily interrupts pressure fluid communication through the flow passage C again isolating the supplied and applied fluid pressures $P, Po$ since the proportioning valve 23 is also in its isolating position. When the supplied fluid pressure $P$ is further reduced to a value less than that of the isolated applied fluid pressure $Po$, a pressure differential is established across the valve member 51 of the metering device 50 which is effective to move said valve member leftwardly toward a position disengaged from the metering valve member 71 to open the metering piston apertures 72, 73 and effect the return flow therethrough of the isolated fluid pressure $Po$ from the outlet port 17 to the inlet port 16. In this manner, the open pressure fluid communication through the flow passage C for the return flow of the applied fluid pressure $Po$ eliminates the applied fluid pressure and also the force $Po(A_3 - A_5)$ acting on the metering device 50 which permits the diaphragm member 60 and stem 55 to also return to their original positions as shown in the drawings.

It should be noted that the return flow of the applied fluid pressure $Po$ from the outlet port 17 to the inlet port 16 may be effected through either of the parallel flow passages B, C, depending, of course, upon which of the proportioning valve or metering device 23, 50 offers the least resistance in said flow passages to said return flow. For instance, if the proportioning valve 23 offered less resistance to the return flow of the applied fluid pressure $Po$, it may alternatively return through the flow passage B instead of the flow passage C, as previously described. In this event, when the supplied fluid pressure $P$ is eliminated upon the deactuation of the master cylinder 2, as previously discussed, the applied fluid pressure $Po$ acting on the seating member 28 displaces the sealing lip 37 thereof from sealing engagement with the housing counterbore 12 to open the return flow passages 38 across said seating member, and in this manner, the applied fluid pressure $Po$ returns from the outlet port 17 through the housing upper bore 10, the counterbore 11, the open return flow passages 38, and the counterbore 12 to the inlet port 16 and therefrom through the conduits 5, 3, to the master cylinder 2. When the applied fluid pressure $Po$ is so reduced to correspondingly reduce the output force $Po\,A_2$ to a value less than the proportioning spring force $Fc$, the proportioning spring 32 moves the proportioning piston 23 rightwardly to its original or inoperative position re-engaging the abutment 31 thereof with the housing shoulder 14 and disengaging the valve member 27 from the seating member valve seat 36 to again open the seating member aperture 34 re-establishing open pressure fluid communication therethrough between the inlet and outlet ports 16, 17 to effect complete elimination of the applied fluid pressure $Po$.

It is apparent that the shape, i.e. the "bellying", of the ideal curve OG in the graph of FIG. 3 for the front brake 8 will depend upon the Newtonian mechanics of the vehicle, such as the length of the vehicle wheel base, static load distribution between the vehicle front and rear axles, and the height of the vehicle center of gravity for instance, and as the vehicle deceleration approaches its maximum rate (which is assumed for our purposes to be in the range of a one G deceleration), the front brake torque requirement increases appreciably. Of course, the great majority of vehicle decelerations or stops are not of the one G variety but instead are in the deceleration range indicated generally by the line OMN in the graph of FIG. 3; therefore, it is apparent that the control valve 6 functions in the system 1, as previously described, not only to effect an actual curve OMNRS closely approximating the ideal curve but also functions to proportion the applied or output fluid pressure $Po$ delivered to the front brakes 8 and limit the amount of torque developed thereby in the rather low vehicle deceleration range indicated generally by the line OMN. In the higher or more intense vehicle deceleration range indicated by the line NRS in the graph of FIG. 3 when the Newtonian mechanics of vehicle braking come into play to such an extend effecting an appreciable vehicle weight shift wherein the front brakes 8 must necessarily assume more of the vehicle braking effort, i.e. a redistribution of the front to rear axle brake balance, it is apparent that the control valve 6 then functions in the systems 1, as previously described, not only to increase the applied fluid pressure $Po$ delivered to the front brakes 8 which eventually blends with the supplied fluid pressure $P$ but also to increase the torque effected by such front brakes to accommodate the inertia weight shift and front to rear axle brake balance redistribution when vehicle decelerations approaching the one G range are effected.

Figure 4:
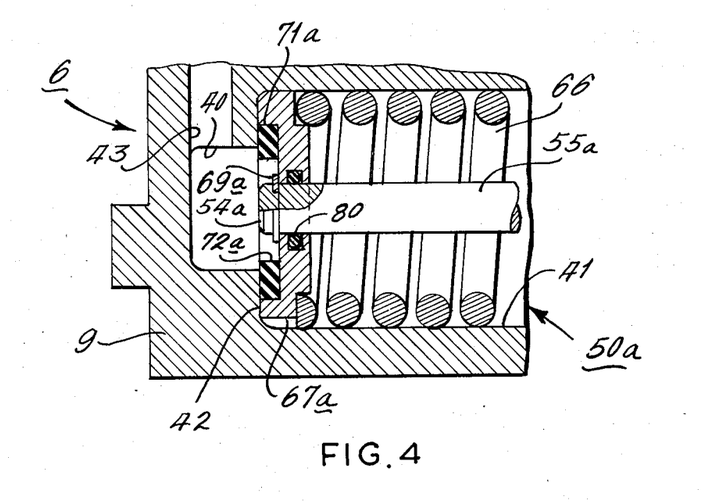
FIG. 4 is a partial sectional view illustrating an alternative construction for the metering valve of FIG. 1.

Referring now to FIG. 4, an alternative construction of the metering device 50a is shown having substantially the same component parts and functioning in the system 1 in substantially the same manner as the metering device 50 of the control valve 6 with the following exceptions.

The metering piston 67a of the metering device 50a is slidably received in the housing lower counterbore 41 having a recess 70a in which is received an annular seal or valve member 71a, and the force $Fs$ of the metering spring 66 acting on the proportioning piston 67a normally urges the valve member 71a into sealing engagement with the housing valve seat 42 interrupting pressure fluid communication through the flow passage C between the inlet and outlet ports 16, 17. Another sealing member or O-ring 80 is carried in the bore 68a of the metering piston 67a in sealing engagement with the periphery of the stem 55a which extends coaxially therethrough, and a snap ring and groove assembly 69a is provided in said stem adjacent to the free end 54a thereof in driving or abutting engagement with said metering piston.

In the operation of the control valve 6 utilizing the metering device 50a, said metering device is responsive to supplied and applied fluid pressures in excess of the predetermined values T and N, respectively, as shown in the graph of FIG. 3. When the applied fluid pressure $P$ is increased to a value in excess of the predetermined value T but less than the predetermined value R, the input force $P (A_4 + A_5) + Po (A_3 - A_5)$ is correspondingly increased to overcome the opposing output force $Po \, A_5$ to which the force $Fs$ of the metering spring 66 is additive; therefore, the metering piston 67a and stem 55a are concertedly movable in the rightward direction toward a metering position disengaging the metering piston valve member 71a from the housing valve seat 42 to effect further metered application of the supplied fluid pressure $P$ from the housing lower bore 40 through the lower counterbore 41 and connecting passage to the outlet port 17 to effect a further proportionally metered increase in the applied fluid pressure $Po$ in the same predetermined ratio as set forth hereinbefore with respect to the metering device 50. When the supplied and applied fluid pressures $P$, $Po$ attain the predetermined R, as shown on the line OS in the graph of FIG. 3, the input force $P (A_r + A_5) + Po (A_3 - A_5)$ attains a magnitude which overcomes the additive metering spring and output forces $Fs$, $Po \, A_5$ wherein the metering piston 67a and stem 55a are concertedly movable in a right-ward direction toward an open position effecting equalizing or open pressure fluid communication between the inlet and outlet ports 16, 17 through the flow passage C wherein the supplied and applied fluid pressures $P$, $Po$ are once again blended, as shown by the line RS in the graph of FIG. 3.

When the supplied and applied fluid pressures $P$, $Po$ are reduced to values less than the predetermined value R upon the deactuation of the master cylinder 2, as previously discussed, the force $Fs$ of the metering spring 66 overcomes the corresponding reduced input force $P (A_4 + A_5) + Po (A_3 - A_5)$ to return the metering piston valve 71a toward its isolating position engaged with the housing valve seat 42 closing the flow passage C. Upon further reduction of the supplied fluid pressure, the return flow of the applied fluid pressure from the outlet port 17 to the inlet port 16 is effected by the proportioning piston 23 only through the flow passage B in the same manner as previously described hereinbefore.

From the foregoing, it is now apparent that a novel system 1 and control valve 6 are disclosed and that changes or modifications so as to the precise connections, configurations, shapes or details of the constructions set forth herein by way of illustration may be made by those skilled in the art without departing from the spirit of the invention.

The embodiments of the invention in which an exclusive property or privilege is claimed are defined as follows:

1. A control valve comprising a housing, a pair of modulating means movable in said housing in parallel flow relation for performing modulating operations on fluid pressure supplied thereto and interrupting said parallel flow relation under preselected conditions, respectively, each of said modulating means being generally operable to interrupt said parallel flow relation upon the modulating operation of the other thereof to effect applications through said housing of reduced fluid pressures in different predetermined ratios with the supplied fluid pressure, respectively, and one of said modulating means including means responsive to the supplied and applied fluid pressure of a common predetermined value to thereafter effect the blending of the supplied and applied fluid pressures.

2. A control valve comprising a housing, a pair of flow passages in said housing and connected in parallel flow relation, a pair of modulating means movable in said flow passages for performing modulating operations on fluid pressure supplied thereto and interrupting flow thereof through said flow passages upon preselected conditions, respectively, each of said modulating means being generally operable to interrupt flow of the supplied fluid pressure through said flow passages upon the modulating operation of the other of said modulating means to effect applications through said flow passages of reduced fluid pressures in different predetermined ratios with the supplied fluid pressure, respectively, and one of said modulating means including means responsive to the supplied and applied fluid pressures of a predetermined value to open one of said flow passages and effect an unmodulated flow therethrough of the supplied fluid pressure.

3. A control valve comprising a housing, proportioning means and metering means movable in said housing in parallel flow relation for performing proportioning and metering operations on fluid pressure supplied thereto and for interrupting said parallel flow relation under preselected conditions, respectively, said proportioning means being operable generally in response to the supplied fluid pressure between first and second predetermined values to effect the application through said housing of a reduced fluid pressure in a predetermined ratio with the supplied fluid pressure when said metering means is interrupting said parallel flow relation, and said metering means being thereafter generally operable in response to the supplied fluid pressure in excess of the second predetermined value and the applied fluid pressure acting thereon to effect a metering application through said housing of the supplied fluid pressure to increase the applied fluid pressure in another predetermined ratio with the supplied fluid pressure predeterminately greater than the first named predetermined ratio when said proportioning means is interrupting said parallel flow relation, and said metering means including means responsive to the supplied and applied fluid pressures of a third predetermined value predeterminately greater than the second predetermined value to thereafter effect an unmetered flow through said housing of the supplied fluid pressure.

4. A control valve according to claim 3, comprising a pair of flow passages in said housing and connected in parallel flow relation, said proportioning and metering means being movable in said flow passages and controlling the applications therethrough of the supplied fluid pressure, respectively.

5. A control valve according to claim 4, wherein said included means opens one of said flow passages to effect the unmetered flow therethrough of the supplied fluid pressure when the supplied and applied fluid pressures attain the third predetermined value.

6. A control valve according to claim 4, wherein said proportioning means includes resiliently urged means movable in one of said flow passages, said resiliently urged means being movable against its own force in response to the supplied fluid pressure of the first predetermined value acting thereon toward a flow interrupting position in said one passage means and being further movable assisted by its own force in response to increases in the supplied fluid pressure in excess of the first predetermined value toward another position effecting the increase in the applied fluid pressure in the first named predetermined ratio, and said resiliently urged means retaining its flow interrupting position in said one flow passage when the supplied fluid pressure exceeds the second predetermined value to effect the metering operation of said metering means in the other of said flow passages.

7. A control valve according to claim 6, wherein said resiliently urged means includes piston means movable in said one passage means, and resilient means engaged with said piston means, said piston means being movable against said resilient means in response to the supplied fluid pressure of the first predetermined value acting on said piston means toward its flow interrupting position closing said one passage means and being thereafter further movable assisted by said resilient means in response to the increased supplied fluid pressure in excess of said first predetermined value and less than said second predetermined value toward its other position effecting the increase in the applied fluid pressure in the first named ratio, and said piston means maintaining its flow interrupting position in said one flow passage when the supplied fluid pressure exceeds the second predetermined value effecting the metering operation of said metering means in said other flow passage.

8. A control valve according to claim 4, comprising seating means in said housing about said one flow passage, and valve means on said piston means for engagement with said seating means, said valve means being engaged with said seating means to close said one passage means when said piston means is in its flow interrupting position and said valve means being disengaged from said seating means upon the movement of said piston means toward its to applied position.

9. A control valve according to claim 4, wherein said metering means also includes resiliently urged means movable on one of said flow passages, and said included means defines a pair of additive effective areas on said resiliently urged means for respective subjection to the supplied and applied fluid pressures in said flow passages, said resiliently urged means being movable against its own force from its flow interrupting position in said one flow passage in response to the supplied fluid pressure in excess of the second predetermined value and the applied fluid pressure respectively acting on said areas toward a metering position effecting the metered increase in the applied fluid pressure in the other predetermined ratio with the supplied fluid pressure, and said resiliently urged means also being movable against its own force toward an open position in said one flow passage effecting the unmetered flow therethrough of the supplied fluid pressure when the supplied and applied fluid pressures respectively acting on said areas attain the third predetermined value.

10. A control valve according to claim 9, wherein said resiliently urged means include piston means movable in said one flow passage, resilient means engaged with said piston means, one of said areas being on said piston means and subjected to the supplied fluid pressure, diaphragm means in said housing subjected to the applied fluid pressure for connection with said piston means and defining the other of said areas, said piston means being movable from its flow interrupting position against said resilient means in response to the supplied fluid pressure in excess of the second predetermined value acting on said one area and the applied fluid pressure acting on said other area toward its metering position, and said piston means also being movable toward its open position against said resilient means when the supplied and applied fluid pressures respectively acting on said one and other areas attains the third predetermined value.

11. A control valve according to claim 10, comprising a valve seat in said housing about said one flow passage, and valve means on said piston means for engagement with said valve seat, said valve means being engaged with said valve seat to close said one flow passage when said piston means is in its flow interrupting position and said valve means being disengaged from said valve seat upon the movement of said piston means toward its metering and open positions.

12. A control valve according to claim 3, comprising passage means in said metering means for the passage therethrough of the supplied fluid pressure less than the first predetermined value, a valve seat on said metering means about said passage means, valve means on said metering means for engagement with said valve seat, said included means including diaphragm means subjected to the applied fluid pressure and connected with said valve means, said diaphragm means being responsive to applied fluid pressure of the first predetermined value to move said valve means toward engagement with said valve seat and close said passage means when said metering means is in its flow interrupting position.

13. A control valve comprising a housing having inlet and outlet ports therein, a pair of passage means in said housing connected in parallel flow relation between said inlet and outlet ports, a proportioning valve and a metering valve respectively movable in said passage means for controlling pressure fluid communication between said inlet and outlet ports, said proportioning valve being movable in response to fluid pressure at said inlet port in excess of a first predetermined value and less than a second predetermined value from a position interrupting pressure fluid communication through one of said passage means toward a position effecting metered pressure fluid communication therethrough to establish a reduced fluid pressure at said outlet port in a predetermined ratio with that at said inlet portion when said metering valve is in a position interrupting pressure fluid communication through the other of said passage means, said metering valve being thereafter movable from its pressure fluid communication interrupting position in said other passage means in response to fluid pressure at said inlet port in excess of the second predetermined value and reduced fluid pressure at said outlet port acting thereon toward a position effecting metered pressure fluid communication through said other flow passage to increase the reduced fluid pressure at said outlet portion in another predetermined ratio with that at said inlet port predeterminately greater than said first named predetermined ratio when said proportioning valve is in its pressure fluid communication interrupting position, and said metering valve including means responsive to the fluid pressures at said inlet and outlet portions of a third predetermined value to move said metering means toward an open position in said other passage means effecting unmetered pressure fluid communication therethrough between said inlet and outlet ports.

14. A control valve comprising a housing having inlet and outlet ports therein, first and second passage means in said housing and respectively connected in parallel flow relation between said inlet and outlet ports, first and second valve seats in said housing about said first and second passage means, first and second piston means movable in said first and second passage means for controlling pressure fluid communication therethrough between said inlet and outlet ports, respectively, first and second valve means on said first and second piston means for engagement with said first and second valve seats, first and second spring means engaged with said first and second piston means, said second spring means urging said second piston means toward a position engaging said second valve means with said second valve seat for interrupting pressure fluid communication through said second passage means between said inlet and outlet ports, said first piston means being initially movable against said first spring means in response to fluid pressure at said inlet and outlet ports of a first predetermined value to engage said first valve means with said first valve seat interrupting pressure fluid communication between said inlet and outlet ports through said first passage means and said first piston means also being thereafter further movable assisted by said first spring means in response to fluid pressure at said inlet port in excess of the first predetermined value and less than a second predetermined value to disengage said first valve means from said first valve seat effecting metered pressure fluid communication through said first passage means between said inlet and outlet ports and establishing a metered fluid pressure at said outlet port in a first predetermined ratio with that at said inlet port when said second piston means is in its pressure fluid communication interrupting position, a pair of effecting areas on said second piston means respectively subjected to the fluid pressures at said inlet and outlet ports, said second piston means being movable from its pressure fluid communication interrupting position against said second spring means in response to the fluid pressure at said inlet port in excess of the second predetermined value acting on one of said areas and the reduced metered fluid pressure at said outlet port acting on the other of said areas to disengage said second valve means from said second valve seat effecting metered pressure fluid communication between said inlet and outlet ports through said second passage means and establishing an increased metered fluid pressure at said outlet port in a second predetermined ratio with that at said inlet port wherein said second predetermined ratio is predeterminately greater than said first predetermined ratio when said first piston means is in its pressure fluid communication interrupting position, and said second piston means also being further movable against said second spring means to disengage said second valve means from said second valve seat and establish open pressure fluid communication through said second passage means between said inlet and outlet ports when the fluid pressure at said inlet port and the metered fluid pressure at said outlet port acting on said one and other areas attain a third predetermined value predeterminately greater than said second predetermined value, respectively.

15. A fluid pressure system comprising a friction device, a fluid pressure source for energizing said friction device, a pair of modulating means in parallel flow relation in said system for performing modulating operation on fluid pressure supplied from said source to said friction device under preselected conditions, each of said modulating means being generally operable to interrupt the parallel flow relation when the other thereof is performing its modulating operation, respectively.

16. A fluid pressure system comprising at least one friction device, a fluid pressure source for supplying fluid pressure to said friction device to effect energization thereof, a pair of modulating means connected between said source and friction device in parallel flow relation for performing modulating operations on fluid pressure supplied from said source to said friction device under preselected conditions, each of said modulating means being generally operable to interrupt the parallel flow relation upon the modulating operation of the other thereof to effect the application to said friction device of the supplied fluid pressure in different predetermined ratios, respectively, and one of said modulating means including means responsive to the supplied fluid pressure in excess of a predetermined value to obviate the modulating operation of said one modulating means.

17. A fluid pressure system comprising at least one fluid pressure responsive brake device, means including a fluid pressure source for supplying fluid pressure to said brake device to effect energization thereof, proportioning means and metering means connected in parallel flow relation with each other between said source and brake device for performing proportioning and metering operations on the supplied fluid pressure and for interrupting said parallel flow relation under preselected conditions, respectively, said proportioning means being operable generally in response to the supplied fluid pressure between first and second predetermined values to effect the application to said brake device of a reduced fluid pressure in a predetermined ratio with the supplied fluid pressure when said metering means is interrupting said parallel flow relation, said metering means being thereafter generally operable in response to the supplied fluid pressure in excess of the second predetermined value and the applied fluid pressure acting thereon to effect a metered increase in the applied fluid pressure in another predetermined ratio with the supplied fluid pressure predeterminately greater than the first named predetermined ratio when said proportioning means is interrupting said parallel flow relation, and said metering means including means responsive to the supplied and applied fluid pressures of a third predetermined value predeterminately greater than the second predetermined value for obviating the metering operation of said metering means and effecting an unmetered flow of the supplied fluid pressure to said brake device.

* * * * *

UNITED STATES PATENT OFFICE
CERTIFICATE OF CORRECTION

Patent No. 3,768,869      Dated October 30, 1973

Inventor(s) Richard C. Bueler and Edward J. Falk

It is certified that error appears in the above-identified patent and that said Letters Patent are hereby corrected as shown below:

Column 6, line 31, "P $(A_2 + A_1)$" should read -- P $(A_2 - A_1)$ --. Column 7, line 53, "step" should read -- stem --. Column 9, line 58, "P $(Ar + A_5)$ + Po $(A_3 - A_5)$" should read -- P $(A_4 + A_5)$ + Po $(A_3 - A_5)$ --. Column 11, line 6, "ing" should read -- ed --. Column 12, line 5, delete "to applied" and insert -- other --; line 62, "toapplied" should read -- to applied --. Column 13, line 14, "portion" should read -- port --; line 24, "portion" should read -- port --; line 30, "portions" should read -- ports --. Column 14, line 36, "tion" should read -- tions --.

Signed and sealed this 16th day of July 1974.

(SEAL)
Attest:

McCOY M. GIBSON, JR.
Attesting Officer

C. MARSHALL DANN
Commissioner of Patents